United States Patent [19]

Felland

[11] Patent Number: 5,158,334
[45] Date of Patent: Oct. 27, 1992

[54] ADJUSTABLE VEHICULAR GLARE SHIELDING DEVICE

[76] Inventor: Raymond G. Felland, 110½ S. Water, Sparta, Wis. 54656

[21] Appl. No.: 655,062

[22] Filed: Feb. 14, 1991

Related U.S. Application Data

[63] Continuation of Ser. No. 381,484, Jul. 17, 1989, abandoned.

[51] Int. Cl.$^5$ ............................................. B60J 3/02
[52] U.S. Cl. ................... 296/97.4; 296/97.11; 296/97.12; 160/5; 160/370.2
[58] Field of Search ............ 296/97.1, 97.4, 97.9, 296/97.11, 97.12, 97.13; 160/DIG. 3, 5, 126, 345, 352, 370.2

[56] References Cited

U.S. PATENT DOCUMENTS

| | | | |
|---|---|---|---|
| 1,814,500 | 7/1931 | Summerbell | 296/97.11 X |
| 1,888,703 | 11/1932 | Summerbell | 296/97.11 X |
| 3,226,151 | 12/1965 | Reuther | 296/97.4 |
| 3,343,868 | 9/1967 | Manookian, Jr. | 296/97.4 |
| 3,403,937 | 10/1968 | Quaine | 296/97.11 |
| 3,857,630 | 12/1974 | Gonzalez | 296/97.4 X |
| 4,874,195 | 10/1989 | Lu et al. | 296/97.4 |
| 4,919,468 | 4/1990 | Abu-Shumays et al. | 296/97.4 |

FOREIGN PATENT DOCUMENTS

| | | | |
|---|---|---|---|
| 979311 | 4/1951 | France | 296/97.12 |
| 68422 | 5/1980 | Japan | 296/97.4 |
| 1387452 | 3/1975 | United Kingdom | 296/97.11 |

Primary Examiner—Margaret A. Focarino
Assistant Examiner—Andrew C. Pike

[57] ABSTRACT

The present invention relates to a glare shielding device which affords significantly improved efficacy in shielding a vehicular occupant'eyes against sun rays. The device includes a glare shield which is preferably pivotally mounted onto a track following guide, a track guide of an arced configuration for tracking the following guide thereupon and the adjusting of the glare shield to a glare shielding position and means for mounting the device onto the vehicular inner roof in close proximity to the occupant's eyes. If desired, the deviced may be equipped with a light sensor and responsive means thereto for automatically adjusting the glare shield to the appropriate shielding position.

2 Claims, 4 Drawing Sheets

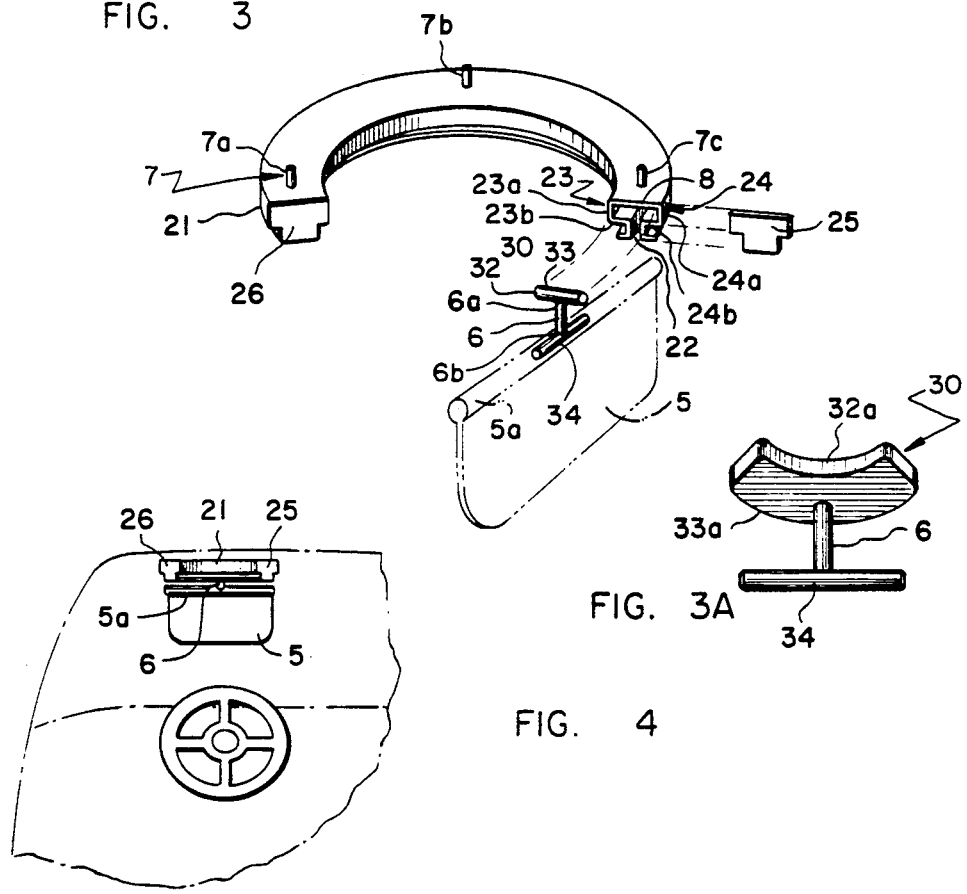
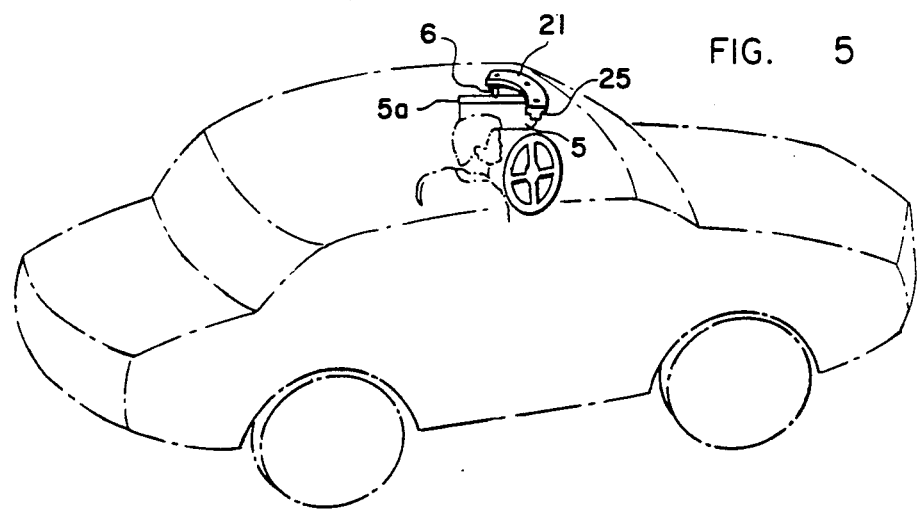

ADJUSTABLE VEHICULAR GLARE SHIELDING DEVICE

This is a continuation of application Ser. No. 381,484, filed Jul. 17, 1989, now abandoned.

FIELD OF THE INVENTION

The present invention relates to a glare shielding device more particularly to an adjustable protective glare shielding device for use in motorized vehicles.

BACKGROUND OF THE INVENTION

It is conventional to equip motor vehicles with an anti-glare device to protect the occupant's eyes against the harmful effect of light rays. The design of early anti-glare devices were substantially different from the modern day devices. U.S. Pat. No. 1,664,124 by Lorenz exemplifies an early glare shielding device. The Lorenz device discloses an interior roof mounted glare shield having a long horizontal arm pivotally mounted onto a roof mounting bracket with a jointed vertical arm extension to which the glare shield is attached. The mounting position forms a pivotal center point so that the horizontal arm will abuttingly arc onto the side and windshield window. The device permits the jointed vertical arm and glare shield to be drawn backwardly against the inner roof when not in use and next to the vehicle side door window or windshield when used. The pivotal mount of the horizontal arm enables the user to position the glare shield in a variety of positions generally unattainable by the more modern glare shielding devices.

U.S. Pat. No. 2,965,415 by Dryden discloses a sun visor device designed to more adequately account for changes in vehicular directions. The Dryden sun shielding device design conforms with certain modern day shielding devices in its mounting near the front roof support post. The Dryden device, however, departs from conventional sun shielding devices in that its design includes at least two horizontally and vertically adjustable sun shields one of which is designed to provide protective shielding for the front windshield and the other side window protection. A further modification of the Dryden multiple shield sun visor includes an additional visor to protect the driver's left side view from light rays.

Other sun visors which have been disclosed by the prior art (without significant acceptance) include U.S. Pat. Nos. 3,403,937 by Quaine, 3,428,360 by Honor, and 3,589,663 by Vance. The Quaine sun visor device differs from conventional sun visors in that it relies upon a continuous horizontal guide member mounted above the windshield and side windows. The guide member extends from above the driver's side window, across the windshield to the rear of the occupant's side window. A pair of pivotally mounted sun visors fitted with a pair of track following members for each visor slideably engages onto guide track member for tracking. The visors may be individually adjusted along the entire guide member length and may be pivotally retracted against the ceiling when not in use. The Quaine device necessitates several feet of guide member trackage. The design and construction of commercial glare shielding devices have remained substantially unchanged for the past half century. Proposed modifications have offered little, if any, advantage over current devices.

SUMMARY OF THE INVENTION

There currently exists a need for an improved glare shielding device and especially one which would offer more protection against glare. The conventional practice of positioning the shielding device in close proximity to the vehicular window areas accentuates the prior art inadequacies. A more closely positioned glare shield device which would afford vertical and horizontal adjustment, without interfering with road vision, to the occupant's eyes would substantially enhance glare protection over conventional devices. It would be of further advantage if such a device would be adapted for mounting onto the inner roofs of modern day vehicles, especially if it could be economically produced on a mass-production basis. Further advantages could be achieved by a glare shield device provided with means of manually or automatically adjusting the glare shield positioning to more directly align the deleterious light rays. Within the context of these prior art problems, the present invention affords a sun shielding device which overcomes these long-felt needs, and the inherent defects of prior art glare shielding devices.

The adjustable glare shielding device of this invention affords a glare shield affixed to a track following guide which slideably engages onto a curved guide track. The device is adapted for mounting onto the vehicular interior roof in close proximity to the shielded occupant so as to optimize the protective glare shielding efficacy of the device.

BRIEF DESCRIPTION OF THE DRAWINGS

FIG. 3 is a rear view showing partially disassembled component parts of the device shown in FIG. 1.

FIG. 3A is a perspective view depicting an alternative track following unit.

FIG. 4 is a rear view of the glare shield shown in FIG. 1 mounted onto the interior roofed portion of a vehicle.

FIG. 5 is a side view showing a modified version of the FIG. 1 device mounted onto the interior roof of an automobile.

DETAILED DESCRIPTION AND PREFERRED EMBODIMENTS OF THE INVENTION

The embodiments of the glare shielding device herein may be more fully appreciated by reference to FIGS. 1-7 and the following description.

Figure 2:
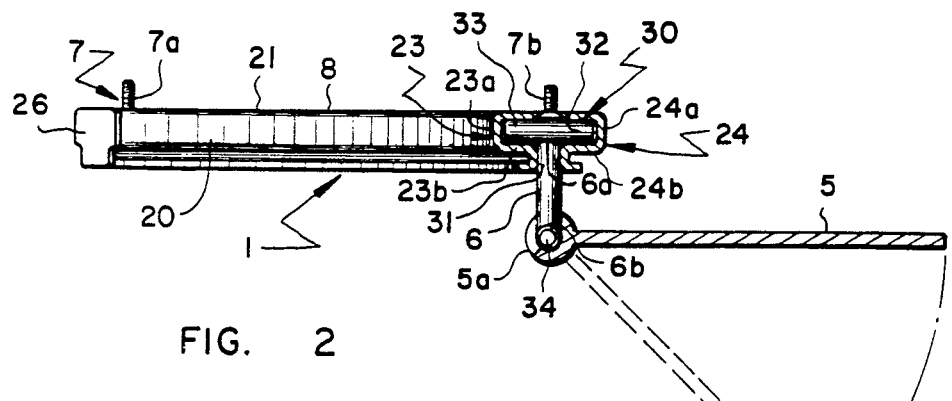
FIG. 2 is a cross-sectional view of the device shown in FIG. 1 taken along line 2—2 with the broken lines depicted herein illustrating a partial pivotal adjustment of the glare shield.
Figure 1:
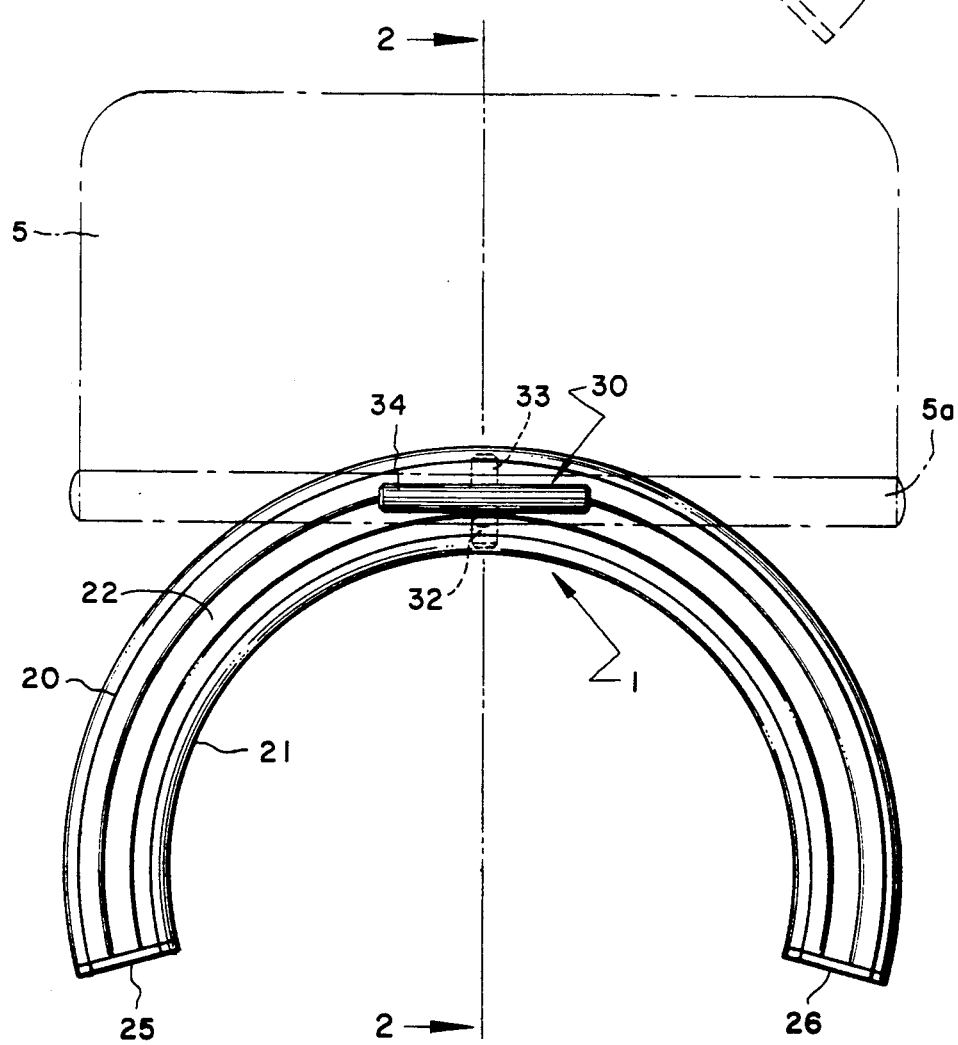
FIG. 1 is a bottom view of the glare shielding device of this invention.

Referring to FIGS. 1-3, there is provided an adjustable anti-glare device (generally designated as 1) which may be vertically and horizontally adjusted along a curved radii to shield the eyes of a vehicular occupant. The anti-glare device generally comprises a curved guide track (generally designated as 20), a track following guide (generally designated as 30) which slideably engages the curved guide track 20, a glare shield 5 for protectively shielding the occupant from deleterious rays, a connecting arm (generally designated as 6) secured at a proximate end 6a to the track following guide 30 and at a distal end 6b to glare shield 5 and means (generally designated as 7) for mounting the anti-glare device 1 onto the interior roofed portion of a motorized vehicle. The illustrated anti-glare device 1 includes a base member 8 fitted with means 7 to permit the mounting of the glare shield device 1 in a centrally disposed juxtaposition to the occupant and substantially rearward from the front windshield.

Referring more particularly to FIGS. 1–3, an apertured housing member (generally designated as 21) structurally provides a curved, channeled trackway for track following guide 30. The housing member 21 (as depicted therein) includes a curved slotted aperture 22, an inner channel housing section 23 bordering the inner margin of aperture 22 and a concentric outer housing channel section 24 bordering onto the outer margin of aperture 22. The inner channel section 23 includes an inner sidewall section 23a vertically extending outwardly from base s and a flanged section 23b which projects perpendicularly and inwardly from sidewall section 23a to the inner margin of aperture 22. The outer housing member 24 is correspondly provided with an outer sidewall section 24a and an inwardly projecting flanged section 24b which extends onto the outer margin of aperture 22. Flanged sections 23b and 24b are concentrically spaced sufficiently apart so as to allow for a projecting post section 30 of track following guide 30 to move freely along the curved trackway afforded by slotted aperture 22. The flanged section 23b and 24b bordering onto slotted aperture 22 in combination with the projecting post section 30 maintain the track following guide 30 in proper alignment for trackage about the curved track guide 20. The central post section 31 in cooperative association With the curved edges 33a and 32a of flanges 23a and 24a maintain the track following guide 30 in a centered position by preventing lateral movement thereof. As may be further observed from FIGS. 2–3, the concentrically disposed inner sidewall section 23a and outer sidewall section 24a in conjunction with the corresponding internally disposed flanged rim portion of section 23b and outer flanged portion of flange section 24b respectively provide an interfacing track guide surface for track following guide portions 32 and 33 of track following guide 30. The terminal ends of apertured housing 21 include a pair of end enclosures 25 and 26 which function as track stops for track following guide 30. It is desirable that one or both of the enclosures be removable to provide an access port for emplacing track following guide 30 therewithin. The particular design and construction illustrated in the Figures includes a detachable side port 25 for accessing the track following guide 30 thereto.

The base member 8 and apertured housing section 21 may be substantially of a unitary construction (as shown in FIGS. 1–5) with a track following guide access port 25. Alternatively they may be separately fabricated and secured together by conventional fastening techniques such as welding, adhesives, tongue and groove combinations (e.g. as often used in portable radios, tape recorders, etc. for storage battery access), bolts, screws, clips, etc. Metallic, thermoplastic, thermoset resinous materials, combinations thereof, and the like possessing sufficient rigidity and strength to serve as components therefore may be used as fabricating materials. Conventional casting, molding, etc. fabricating techniques may be utilized to separately or unitarily manufacture the base member 8 and apertured housing section 21.

Referring in particular to FIGS. 1–3, an apertured housing 21 provides a curved channeled trackway for track following guide. Housing 21, as depicted therein, includes a curved slotted aperture 22, an inner housing member 23 bordering onto the inner margin of aperture 22 and a concentric outer housing member 24 bordering onto the outer margin of aperture 22. The inner housing member 23 includes sidewall section 23a extending outwardly from base 8 and a flanged section 23a to the inner margin of aperture 22. The outer housing member 24 is correspondly provided with an outer sidewall section 24a and an inwardly projecting flanged section 24b which extends to the outer margin of aperture 22. Flanged sections 23b and 24b are concentrically spaced sufficiently apart so as to allow for a projection portion of track following guide 30 to move freely along the slotted aperture 22 therebetween. As may be further observed from FIGS. 2–3, the concentrically disposed inner 23 and outer 24 housing members form an enclosed channel in which the internally disposed rimmed portions of flange section 23b and flange section 24b form the interfacial contacting surface for the track following guide 30.

As further illustrated in FIG. 2, the track following guide 30 may suitably comprise a centrally disposed post section 31 to guide the track following guide 30 along the slideable aperture 22 and a pair of tracking or laterally extending following guides 32 and 33 which respectively slideably engage onto the interfacing flanged surfaces (23b and 24b) of track guide 20. The perpendicular and lateral positioning of track following sections 32 and 33 onto the projecting central post section 31 forms a T-shaped track following guide 30. The T-shaped construction of the outwardly extending track following guide members (32, 33 and post 31) in combination with the matingly guide track 20 provides a means for slideably adjusting arm 6 along the entire curvature of aperture 22. The post section 31 serves as a guide to prevent lateral movement therewithin and as a connective supportive structure for arm 6 and glare shield 5. The anti-glare shield components appending to arm 6 may thus be horizontally adjusted along the entire curved track aperture 22 of housing 21. This particular combination optimizes glare protection by affording a greater latitude for horizontal glare shield 5 adjustment along the entire curved radii of aperture 22 while also providing for placement of shield 5 in closer proximity to the occupant's eyes.

If desired, the depicted guide track 20 and track following guide 30 system may be replaced with other types of guide track and track followers. Illustrative replacements therefore include roller track followers in combination with channeled or grooved guide tracks, multiplanar guide track and track follower systems, and the like. Definite advantages, however, are afforded by the depicted T-shaped track following and mating guide track system. These advantages include a relatively inexpensive tracking system to manufacture and maintain while also affording a system which effectively supports and maintains the glare shield in proper vertical and horizontal alignment throughout the curved trackway. Undesirable vertical pitching or sliding (e.g. due to roadway roughness and vehicular vibrations) are generally alleviated thereby. The cooperative interrelationship between the track following guide sections (31, 32 and 33) and the corresponding guide track components thereto effectively stabilizes and maintains the glare shield 5 at the appropriate vertical alignment. Inadvertent horizontal or longitudinal displacement of the glare shield during normal vehicular operation is effectively obviated since the slideable engaging relationship between the track follower 30 and guide track 20 is designed to create sufficient frictional drag to prevent its longitudinal dislodgment from the desired track setting. Frictional drag between the interfacing surface may be imparted via unpolished or roughened interfacing surfaces, cross-wise notching, corrugating or incorporating scaled gradients onto the rims 23b and 24b, relatively high friction interfacing components, tight tolerance or gapping between the track following and guide track components, frictional impediments strategically positioned along the slotted aperture 22 or center guide post 31 and the like.

In the particular embodiments of the invention shown in the drawings, arm 6 is depicted as a unitary extension of post section 31. In the preferred embodiments of the invention, the track following guide 30 (including sections 31, 32 and 33 thereof) and the arm 6 (including the portion of the arm extending outwardly from the post 31 and the swivel mounting post 34) for the glare shield are of a single piece, unitary construction. Such a one piece construction enhances structural and supportive strength, substantially reduces tooling, fabricating, assembling and raw material costs without sacrifice to its functional efficacy. The track following guide 30 and connective arm 6 may be of similar construction as those materials used to fabricate housing 21.

In the alternative track following unit 30 depicted in FIG. 3A, the track following unit 30 is designed so as to mately interfacially and slideably engage onto a portion of contoured curvature of curved guide track 20. As will be observed therein, the terminal edges of the track follower 30, which are referenced as 32a and 33a, include a curvilinear structure for slideably mating onto the curvature of guide track 20. This is accomplished by contouring the edges of 32a and 32b so as to coincide to the internal curvature of the arc of guide track 20. The periphery edges 32a and 33a of follower 30 form an arced follower 30 substantially conforming concentrically to the curvature of the arc formed by inner sidewall section 23a and outer sidewall section 24a. The thickness of the track follower 30 may also be appropriately sized so as to slideably and matingly engage onto the top inner surface of base 8 and the inner surface of flanged sections 23b and 24b. By designing a track following guide 30 so as to mate onto an arced portion of the track guide 20, lateral movement of track follower 30 within track guide is minimized which in turn insures a constant and uniform positioning of the glare shield $ throughout the entire track arc. If desired, the leading edges of the track following guide 30 may be rounded or beveled (as illustrated in FIG. 3A) for purposes of placing curved edges 32a and 33a of follower 30 in proper alignment with the arced channel of track guide 20. Similarly the post section 31 is designed so as to snuggly and slideably engage onto the bordering margins of aperture 22 and, if desired, may also embody a curvilinear structure so as to slideably mate onto the curvature of aperture 22. In this more limited embodiment of the invention, peripheral edges 32a and 33a will advantageously service an arc section of at least 5 mm and preferably of about 1 cm or more (e.g. about 1 cm to about 5 cm).

The anti-glare device depicted in the FIG. 1 is designed so as to permit a 180 degree adjustment. The curved trackage may be substantially reduced in arcuate coverage (as further illustrated by the FIG. 5) since the glare shield 5 is operatively positioned in close proximity to the occupant's eyes. Pragmatically, the arc range served by the curved guide track 20 and track following guide 30 will generally be greater than 30 degrees and more typically at least 40 degrees or more. In a more limited aspect, the curved radii served by guide track 20 will service an arc ranging from about 50 to about 150 degrees and preferably an arc within ranging from about 70 degrees to about 120 degrees. The outer edges of the glare shield 5 will normally extend beyond the major axis of the slideably adjustable downwardly extending arm 6 which will account for an additional field of glare shielding. A greater servicing arc (e.g. about 180 degrees to about 240 degrees or more) may, if desired, be applied to this invention.

Housing 21, including the internally disposed guide track 20, does not require a substantial track length in order to provide adequate glare protection. In general, the track guide 20 will normally be at least 5 centimeters (cm) but less than about 60 cm in total arc length. Longer arc lengths will generally require the glare shielding device to be mounted at an undesirable distance from the occupant's forehead. Advantageously the guide track length as measured along slotted aperture 22 will range from about 10 cm to about 50 cm in length with a guide track length ranging from about 15 cm to about 30 cm being most typically suited for most adaptations herein.

A vareity of mounting means 7 may be used to secure the anti-glare device 1 onto the inner roof. The particular mounting means 7 (as illustrated in FIG. 2 and 3) includes base 8 fitted within mounting screws 7a, 7b, and 7c which are adapted to be secured onto an inner roof plate correspondly fitted with registering threaded apertures (not shown) for securely affixing it onto the metallic inner roof portion beneath the headliner. Illustrative other suitable mounting means 7 may include a slotted female member or flanged male member securely affixed onto the metallic portion of the roof and extending outwardly from the headliner exterior surface with a correspondly mating flanged male projection or a slotted female projection firmly secured onto the base 8 for operative engagement and securance of the base member 8 onto the vehicular roof. This particular combination may be used to provide a detachable glare shield device. Alternatively the base member s may be appropriately mounted onto an interior roof template of a matching surface area and secured thereto by an adhesive cement such as a thermoset resin. In another mounting version (also not shown), the roof interior may be factory equipped with a base plate projecting from the roofed interior upon which the base member s may then be securely mounted. The anti-glare device 1 may also be of a compact and lightweight construction which permits other mounting means 7 such as directly bonding or adhesively attaching the base 8 onto the headliner, or fitting the base 8 and headliner with mating hook receiving or looped naps and a hooking nap combination such as currently manufactured and marketed under the VELCRO trademark.

The downwardly extending arm 6 should be of sufficient length to permit the glare shield 5 to be freely adjusted along the guide track 20. The most appropriate length of arm 6 will depend largely upon the interior roof head space. Vehicles of a roomy head space (e.g. heavy duty trucks and semi-tractors) will appropriately accommodate a more lengthy arm 6 (e.g. 40 cm or more) than many of the modern day passenger vehicles which will generally utilize an arm 6 measuring less than about 10 cm in length. In a more limited embodiment, the arm 6 length (as measured from the exterior aperture 2 lips to its joinder the glare shield periphery edge 5) will be less than about 15 cm and advantageously less than about 10 cm. In the present invention, it is advantageous to utilize the shorter arm 6 lengths and, if necessary, to compensate for any head space deficiency by increasing the glare shield 5 height. The arm 6 length for most passenger vehicles will typically fall within the range of about 0.5 cm to about 7 cm with a length ranging from about 1 to 4 cm being most typically therefore.

In the preferred embodiments of the invention, arm 6 is equipped with a pivotal mount which allows a pivotal adjustment of the glare shield. As previously mentioned and illustrated in FIG. 3, the track following guide 30 and arm 6 (including its pivotal mount 34 for the glare shield) are preferably fabricated as a single piece. The illustrated arm shield mount 34 (as illustrated in FIG. 3) relies upon a T-shaped mount member which correspondingly mates onto sleeved section 5a of glare shield 5. This particular combination enables an occupant to swivel the glare shield 5 upwardly (preferably against the headliner) when not in use and when needed to downwardly reposition it at the appropriate glare shielding position. A still further alternative may embody the track following guide 30 and arm 6 constructed of a relatively rigid plastic material in which arm 6 possesses sufficient rigidity as well as pliability to maintain the glare shield 5 in an appropriate adjusted position. The molded plastic construction should, however, possess sufficient rigidity to maintain the glare shield 5 at any given setting by the occupant. Alternatively, arm 6 may be fitted with ball member which in combination with a centrally disposed ball socket anchored onto the upper periphery margin of glare shield 5 forms a pivotal ball and socket unit which allows pivotal adjustment of the glare shield 5 to the appropriate horizontal and vertical position. Other alternative means which achieve the desired pivotal glare shield positioning may also be utilized herein.

The glare shields herein may be of a variety of configurations (e.g. rectangular, circular, concave, convex, elliptical, triangular, etc.) of sufficient size and surface area to protectively shield and provide sufficient roadway vision to the occupant. The glare shield 5 may be constructed of a variety of semi-transparent or opaque materials which afford adequate protection against glare. Similar to conventional sun visors, the glare shield 5 may be fabricated from materials which completely block the light rays. Alternatively semi-transparent, polarized light reflecting materials, or other transparent materials essentially sensitive to light intensity with a capacity to adjust the light transmission or reflective rate (e.g. such as currently available within the sun glass and prescription eye glass trade) and the like may serve as glare shield 5.

The glare shield 5 dimensions may be smaller in size than conventional visors, and especially as to the width. Conventional corner post visors will most commonly measure 15 cm or more in width and often 40 cm or more in length. In the present invention, the glare shield 5 is designed to vertically extend downwardly from arm 6 to a horizontal positioning above the occupant's eyes so as to provide substantially unobstructed horizontal line of forward roadway vision to the occupant. Opaque glare shield materials are appropriately sized of a width so as to provide an unobstructed line of roadway vision (i.e. perpendicular to the lower glare shield edge 5 in the fully extended downward position as illustrated in FIG. 5) to the occupant. Glare shields constructed of light blocking transparent materials may extend below the occupant's pupils, but preferably are commensurate in size to the aforementioned opaque shield size. When the device is adapted to modern day passenger cars, the glare shield 5 width will advantageously measure less than about 20 cm (e.g. about 5 to about 20 cm) and preferably will range from about 10 cm to about 15 cm in width. These narrower glare shield widths will generally afford sufficient glare shield protection to the occupant while also permitting it to be easily nestled against the roof headliners when not in use.

The present device more effectively blocks sunrise and sunset light rays than the conventional post mounted visors. Generally the positioning of the glare shield device 1 (as illusted in FIG. 5) affords at least an equivalent or greater light ray shielding protection even when the glare shield is of a substantially lesser shield length (e.g. less than about 30 cm such as about 15 to 25 cm) than is commonly used in conventional glare shielding devices. Longer glare shields (e.g. about 30 cm-60 cm) will, however, afford additional glare protection against light rays which conventional glare shields cannot block and especially when the track guide 20 bridges onto or bisects the occupant user's forehead or arm mount 34 angularly pitches the glare shield slightly towards the front windshield opposite to the occupant's seated position. By these embodiments light rays originating from light sources outside the actual glare shield positioning are effectively blocked by the present glare shield device.

FIG. 5 illustrates the glare shield device 1 with a guide track 20 affording about a 120 degree arc instead of the 180 degree arc depicted by FIG. 1 device. The shield mount positioning (as depicted therein), provides about a 90 degree angular pitch (which may be varied if desired) in relationship to the major longitudinal axis formed by laterally extending guides 32 and 33. As illustrated in FIG. 4, arm 6 vertically projects sufficiently outwardly from track following guide 30 to clear housing 21. The legged extensions at the distal end 6a of arm 6 serve as a pivotal mount 34 for correspondingly registering onto a sleeved section 5a of the glare shield 5 (similar to conventional glare shielding devices) to allow for pivotal adjustment thereof. In relationship to the longitudinal alignment or major axis of laterally extending guides 32 and 33, the pivotal mount 34 is placed in an offset or angular pitched position. For example, if pivotal mount 34 is pitched at about 30 degrees the protective shielding effect will then be afforded for those light rays emitting to the right of the driver's forward vision. On the passenger side of the vehicle pivotal mount 34 may be corresponding pitched in corresponding counterclockwise fashion to afford an additional protective shielding for sun rays which emit from the driver's side of the vehicle. This will permit a guide track 20 of a more limited arcuate range to accentuate the overall shielding effect towards its angular pitch. The pitch of mount 34 and guide track 20 are advantageously equilibrated so as to afford glare protection along an arc at least ranging from about 40 to about 130 degrees.

FIG. 5 illustrates a side view of the glare shield device 1 mounted onto the interior roof of an automobile. In contrast to conventional glare shielding devices which are typically mounted in juxtaposition to the windshield, the present device is designed for mounting onto the roof so that the glare shield in its vertically extended position will be in closer proximity to the occupant's forehead than it is to the windshield. The glare shield device 1 is adapted to shield a single occupant, and especially for shielding the front seated passengers of an automobile. The primary sectors for the automotive mounting of guide tracks 20 are respectively within a substantially centrally disposed site within the left front quarter roof section and the right front quarter roof section of the vehicle. The primary seating position for two front seated occupants within most motorized vehicles will normally extend along a plane which perpendicularly bisects the right and left half portion of the front windshield. One or more glare shield may be accordingly mounted onto the roof interior in substantial alignment along these bisecting planes. The curved guide track 20 is positionally mounted forward from the front seat backrest and rearward from the intersecting juncture of the front windshield and the roof. Advantageously, the glare shield device for a left front seated occupant will afford protective blocking for those light rays emitting from a source to the right side of the windshield (e.g. 90 degrees to about 110 degree arc on chord) and preferably for rays entering the vehicle from a source bearing at least about 120 degrees or more (e.g. about 90 degrees to about 140 degrees). Protection within the 90–180 degree arc may be accomplished by either pitching of the glare shield mount 34 or by the use of a wider arc for guide track 20 or a combination thereof.

In general, the track guide 20 will advantageously be mounted in substantial alignment to one of the perpendicular bisecting planes of the front half section of the windshield at a position of more than about 5 cm (e.g. about 5 cm to about 50 cm) removed from the windshield and roofline intersect. The mounting thereof will typically range from about 5 cm to about 10 cm for compact automobiles, about 8 cm to about 12 cm for standard sized automobiles, and about 10 cm to about 25 cm for standard-sized pick-ups. Large trucks and semi-tractors will typically be more further removed from the roofline and windshield juncture.

In the preferred embodiments of the invention, the device is mounted onto the roof interior at a mounting site sufficient to permit at least a portion of the guide track 20 to substantially align onto the interior roof quarter section intersects (i.e. the bisect one of a one-half segments of the front windshield) at a position of about 10 cm to about 20 cm removed from the corresponding windshield/roofline bisect thereto.

The means for mounting the device onto the roof may additionally include a variable means for adjusting the glare shield in a forward or aft position such as may be provided slideable tongue and groove combination. By this means, the glare shield may be appropriately adjusted to accommodate for seat adjustments and the size of the user. The device is preferably mounted at a fixed site upon the roof at a position to permit the glare shield to be positioned slightly ahead of the occupant's forehead (e.g. 1 cm) when the occupant's seat has been adjusted to its most forward position. In relation to the occupant's forehead, the leading edge of the downwardly extended glare shield will generally be disposed from about 4 cm to about 20 cm and most typically from about 5 cm to about 15 cm forward of the occupant's forehead.

Figure 7:
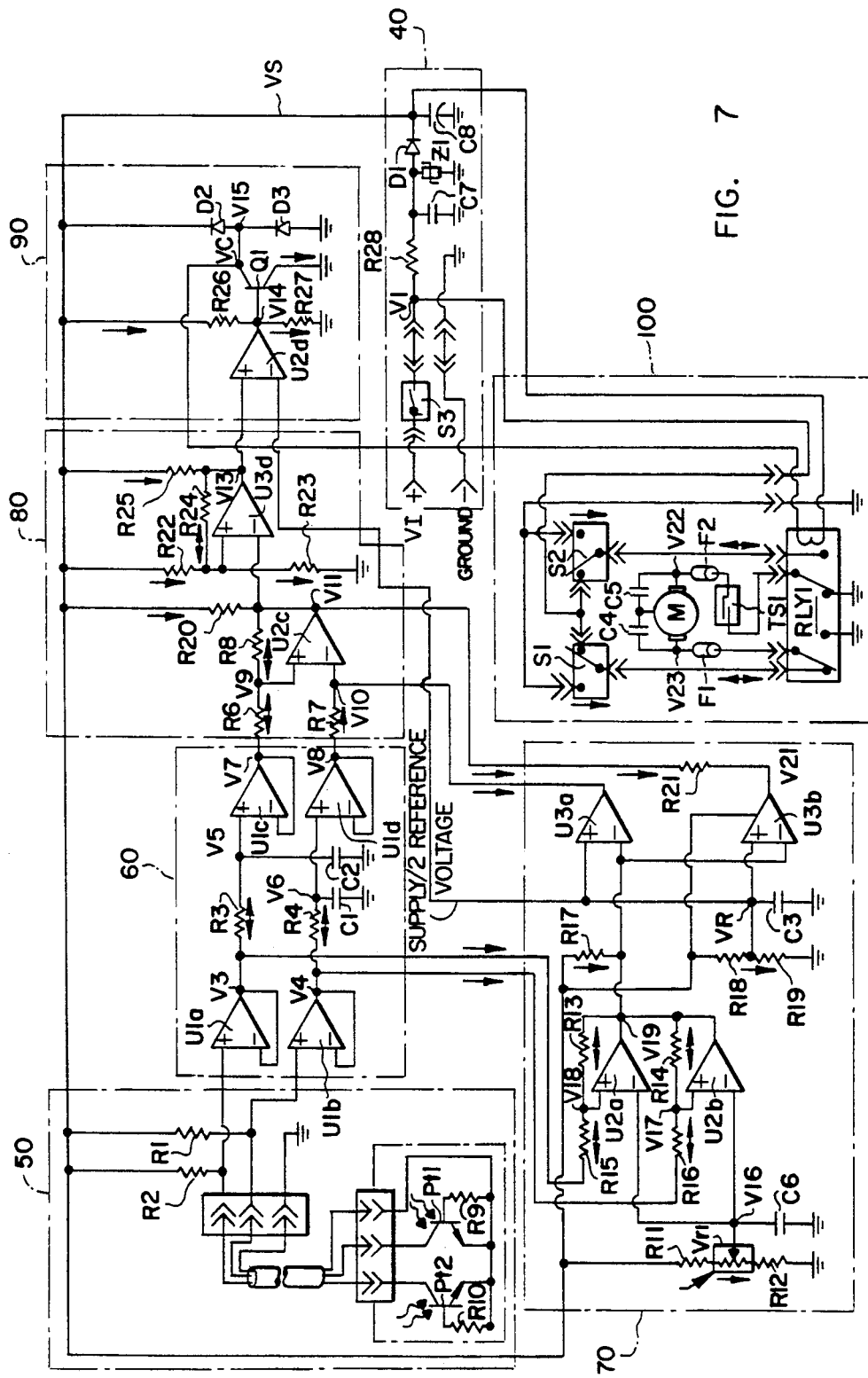
FIG. 7 depicts more specifically the electronic circuitry for an automated version generally depicted in FIG. 6.

The glare shielding device may also be equipped with an accessory unit for automatically adjusting the glare shield to a light blocking position. FIG. 7 illustrates the preferred embodiments of the electronic circuitry for the automated unit. The accessory unit is adapted for hook-up with a conventional mobile electronic power source such as a conventional 5–12 volt battery system. The accessory unit in association with an electronic power source generally comprises a light sensing system adapted to directionally receive and sense the intensity of light along a plurality (two or more) of arciform sites bearing a correspondent registration onto a plurality of glare shield positioning sites along the curved guide track 20, means for operatively converting the directionally received light of the light sensing system into a transmitted registering signal which correspondently registers onto a specific site along the curved guide track 20, relaying means for receiving and converting the transmitted signal into an electronic command signal, and a power train operatively responsive to the command signal for powering and aligning the track following guide 30 along the guide track 20 in correspondent registration to the transmitted signal.

Figure 6:
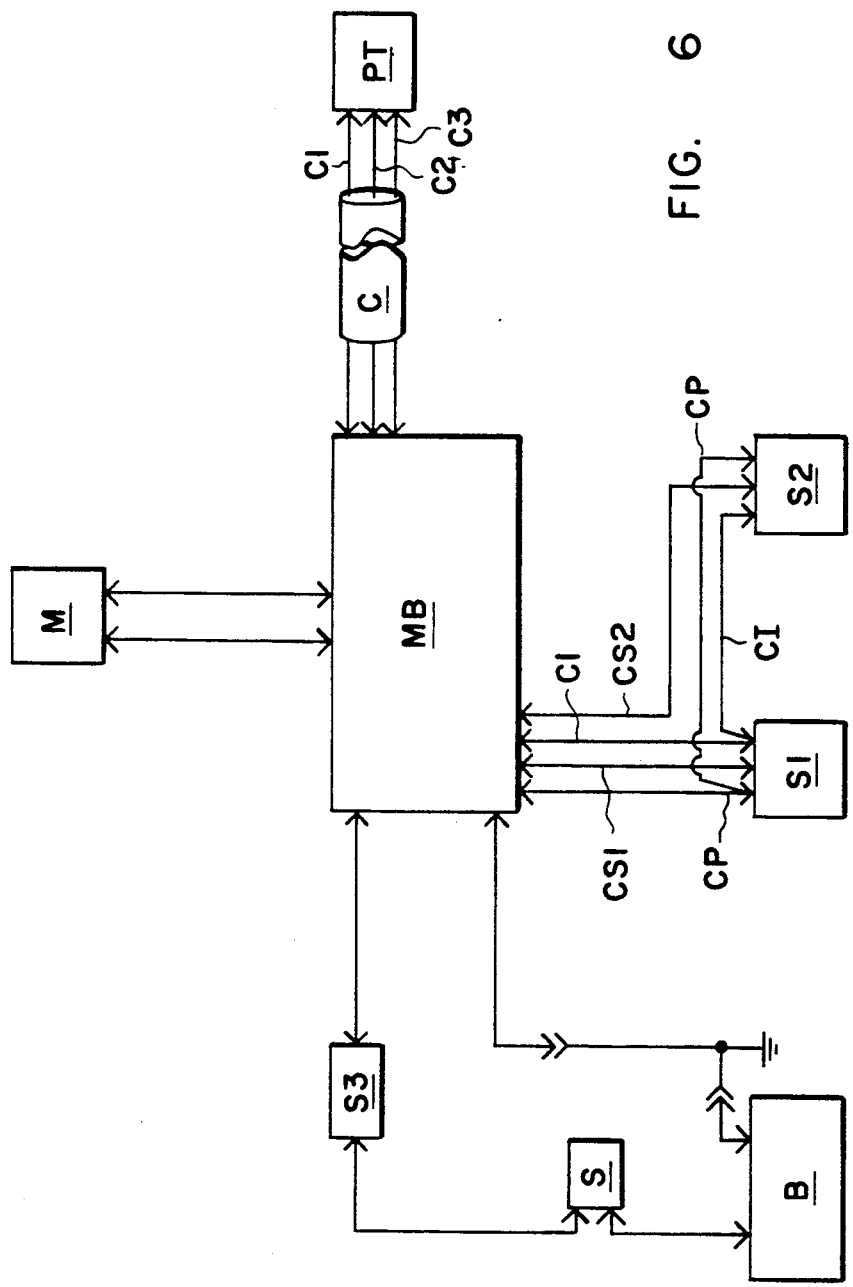
FIG. 6 depicts a generalized view of the electronic system for an automated glare shield device.

By referring to FIGS. 6–7, the embodiments of an automated glare shielding device will be more fully appreciated. The block diagram of FIG. 6 provides an overview of the electronic system for an automated glare shield. As may be observed from FIG. 6, current from a suitable power source B (e.g. vehicular storage battery) is fed through the vehicular ignition switch S and a manual override switch S3 to the main circuit board MB. The main circuit board MB (e.g. located in the track area) is operationally associated with a sensory assembly PT (e.g. located on top of the dashboard) which photoelectrically senses light intensity from multiple light recepting sites, the output of which is directly fed to the main circuit board MB. As explained in greater detail with reference to FIG. 7, the main board circuitry upon receipt of the photo-electric assembly output in combination with the input from switches S1 and S2 interpolates the then existing positioning of the glare shield to the light intensity output of the sensor assembly, and if the glare shield positioning is not properly synchronized therewith, the main board circuitry will activate the appropriate switch (e.g. S1 or S2 positioned at track ends) for engaging the motor M (e.g. mounted to track drive system) to drive the glare shield to a proper shielding position which bears the corresponding registration to the light intensity as received and outputted by the sensor assembly PT and interpolated by the main board circuitry.

The electronic circuitry and component parts for the automated accessory unit are preferably of compact design. The main circuit board M and closely associated circuitry thereto may be effectively incorporated therewithin in the form of a printed board construction with conventional automotive electrical wiring (e.g. 16–22 gauge) providing the power supply and ground connector for the main circuit board MB, the remote components thereto such as the motor M and the power track switch S1 and S2 therefore as illustrated in FIG. 6. Referring in particular to electrical conduits leading from the circuit board to the track switches S1 and S2, conduits C1 serves as common power supply and Cp as a common ground for switches S1 and S2 with CS1 and CS2 serving respectively as the switching pole conduits for track switches S1 and S2. The electrical conductors from the main circuit board (MB) to the sensor assembly (PT) is preferably of a twisted shielded cable (generally designated as C) fitted with Molex connectors in which conduits C1 and C2 serve as the photoelectric conduits for each of the respective photo sensors (e.g. Pt1 and Pt2) of the sensor assembly PT and C3 as common electrical connection therefore.

The electronic circuitry (as shown in FIG. 7) advantageously includes means for relaying and transmitting an electronic signal from the photoelectric units with means for converting the transmitted signal into an electronic command signal which appropriately engages the electric motor (M) so that it will correctly respond to the command signal and provide sufficient power to drive or move the track following guide 30 to the proper track and shielding position. The electronic command signal as outputted by the illustrated system, in effect, affords a means whereby the electric motor only becomes engaged to power and align the glare shield to a different setting with curved guide track 20 from its then current setting due to a directional shift in sun light intensities as detected by the photo sensors (Pt1 and Pt2) and as accentuated by the circuitry.

With specific reference to FIG. 7, there is shown in greater detail an integrated electronic circuit for an automated accessory unit within which the broken lined regions designate various functional portions of the overall circuitry. In general, the depicted portions thereof include a power conditioning circuit (the regions generally designated within the 40 portion) operatively connected to a battery power source or voltage feed (VI) which supplies the driving current to a photo sensor circuit (the region generally designated as 50 which circuit is current oriented and current controlled) with thresholding outputs of the photo sensor circuitry 50 being fed through the voltage controlled photo sensor low pass filter and buffer circuitry (the region generally designated as 60), the output of which (depending upon current intensity) is operatively fed through a low light intensity level detection circuitry (the region generally designated as 70) or a high level light intensity detection and directional buffer circuitry which region is generally designated therein as 80. The low light level detection circuitry 70 and the higher level detection and directional buffer circuitry collectively serve to control, monitor and regulate the ultimate electronic output of the higher level detection and directional buffer circuitry 80 for driving the steering relay drive circuitry, the region of which is generally designated as 90. The supply/2 reference voltage is conducted between the positive terminal of comparator U3a of the low level light detection circuitry 70 and the negative input terminal of comparator U2d of the steering relay circuitry 90. Electronic output from the steering relay drive circuitry 90 is electronically conducted to the relay and motor assembly (the region generally designated as 100) through a relay control connection thereto.

A conventional automotive D.C. battery (e.g. 5-2 volt) or other power source may serve to provide the electrical power supply for the automated accessory unit. The circuitry for the accessory unit illustrated in FIG. 7 is designed to interpolate and distinguish variances of light intensities as received by the radially directed photo sensor Pt1 and Pt2 and responsively engage and power the glare shield 5 to the appropriate light shielding position. The directionally fixed photo sensing system (as illustrated in FIG. 7), is comprised of two photo sensors (Pt1 and Pt2) which afford multiple sensing sites for registration to correspondent glare shielding sites to track guide 20. If desired, a relatively costly and complex light tracking photoelectric sensor in operational association with the track following guide 30 to provide a precisely accurate registration of the glare shield along the entire and full arc of guide track 20 may be optionally used for this purpose.

The two fixed photo sensor applications (as depicted in FIG. 7) may comprise two sensors, Pt1 and Pt2, of a design so as to selectively receive and sense light intensity from at least two distinctively different quadrants or arc ranges served by guide track 20. In such a two photo sensor system, the Pt1 and Pt2 sensors may be sensitized to directionally intercept and respond to lighting thresholds from opposing light sources. The two sensors, Pt1 and Pt2, are thus typically directionally fixed (internally and externally) to cooperatively associate with other electronic components of the automated circuitry so as to gradiently distinguish between the two light intensities falling within different quadrants of track guide 20.

The photoelectric receptors (Pt1 and Pt2) are appropriately placed at a mounting site which allows direct contact with light rays falling within each of their respective servicing quadrants. Emplacement of the photoelectric receptors Pt1 and Pt2 near the windshield, upon the dashboard, onto the front windshield, or any other suitable fixed mounting site for direct light ray interception within the respective quadrant fields may be used for this purpose. Typically these photo sensors (i.e. Pt1 and Pt2) will be placed in a fixed position to radially sense incoming light from sources angularly differing by more than about 30 angular degrees (e.g. about 30 to about 150 degrees), advantageously by more than about 45 angular degrees (e.g. about 45 to about 135 degrees) and preferably within about 60 degree to about 120 angular degree range.

Alternatively, the radially fixed photo sensors of two or more photoelectric receptors (e.g. Pt1 and Pt2) may be partially shaded in such a manner so that each receptor will directionally receive or come into contact with only those direct sun rays falling within a specific arc region served by any given receptor. For example, in such an alternative two photoelectric receptors (Pt1 and Pt2) system, one of the receptors (e.g. Pt1) may be shielded and directionally set for correspondent registration with the track following guide such as at 45 degrees and the other (Pt2) at 90 degrees or more (as ascertained by a left seated occupant) in which 90 degrees setting represents light emitted from a light source straight forward from such an occupant's seated position and zero degrees representing light emitting along the left plane perpendicular thereto.

Thus, the photoelectric sensing system herein generally requires a means for detecting the intensity of light from at least two directionally opposing arcuate sites. The illustrated photoelectric sensors (Pt1 and Pt2) of FIG. 7 may be accordingly positioned at a fixed location for directionally receiving unobstructed sun light rays from opposing radiating light sources. The photoelectric light sensors (Pt1 and Pt2) are preferably placed in a perpendicular relationship at 90 degrees (e.g. one positioned straight forward and the other perpendicular thereto), but may be, if desired, skewed at different angular positions. Sensors Pt1 and Pt2 may also be placed in a recessed position (e.g. within the chassis housing the sensors) so to more directionally receive and detect screened sun light falling within the respective quadrants served by each of the light sensors Pt1 and Pt2. In illustrative operation thereof, sun light sources falling within the 0-45 degree arc range will activate Pt1 for a correspondent registration to a 45 degree track following guide setting while the other receptor Pt2 will correspondingly register a 90 degree track following guide setting for sun light emitting from an angular source of more than a 45 degree (e.g. 45-180 degrees). In a preferred version, each of the photoelectric sensors may be optionally equipped with minimum light intensity thresholds for activation and a manual adjustment for pre-setting the sensors to the desired minimum threshold values.

As mentioned, the light sensory circuitry is appropriately equipped with means of responsively transmitting an electronic signal when the light intensity received by or admitted to the light sensing receptor is sufficient to activate its signal sensing emitter. Since each light sensor serves a specified quadrant or arc, the particular light sensor receiving the more intense light rays (e.g. sun rays) as processed through the integrated circuitry will responsively transmit an electronic signal for the powering of the motor relay and drive circuitry 100.

The particular circuitry depicted in FIG. 7 is thus designed so as to maintain the glare shield 5 in a stationary position until the vehicle directionally changes its course which will then cause the circuitry to responsively engage the relay motor and drive circuitry 100 and establish a new glare shield 5 position. The photo sensor circuitry 50 output, as further monitored and regulated by the over-all circuitry depicted in FIG. 7, affords a means herein for maintaining or altering the track following guide 30 positioning to correspondly register within the quadrant of the particular photoelectric sensor unit which emits the strongest signal. The cooperative relationship between the photo sensor low pass filter and buffer circuitry 60, the low light level detection circuitry 70, and high level of light detection and directional buffering circuitry so as received and electronically transmitted by the steering relay drive circuitry 90 to the relay and motor assembly circuitry 100 coupled with its internal sensing switching mechanism affords the electronic command signal means for activating the power train and driving the track following guide 30 for the repositioning of the following guide 30 upon guide track 20 to a newly established quadrant which bears a direct and correspondent registration to a higher light intensity emanating from a different quadrant light source.

If desired, the automated unit may rely upon a single photo sensor (not shown) retrofitted onto the shield 5 with the necessary circuitry therefore to provide in conjunction with the glare shield 5 a self-tracking photoelectric sensing system. The single self-tracking photo sensor system may include a sensor output digitized through an analog to a digital converter fed into a micro-processor. The unfixed, solitary sensor may be appropriately secured onto the glare shield 5 (e.g. along lower outward edge of the glare shield 5) for direct interception of unobstructed sun rays. The single photo sensor in response to the light intensity via its analog to digital converter microprocessor affords a convenient means whereby an electric command for activating motor (M) and the drive mechanism translocates the glare shield 5 in the direction of the highest light intensities until the increasing micro-processing function equals zero which stops the glare shield 5 in direct alignment with the light intense source. A less complicated two sensor circuitry for tracking shield may be mounted onto the glare shield 5 at different fixed angles with the controller simply moving the shield 5, until the theta of the light source of one sensor is equal to that of the other sensor.

In the preferred accessory unit embodiments of FIG. 7, the unit includes a power conditioning supply circuitry 40 connected to vehicular ignition switch through which the current from the vehicular battery flows. The particular illustrated power conditioning supply circuitry 40 includes: resistor (R28); surge absorber (Z1); glass capacitor (C7); a single pole single throw switch (S3); diode (DI); and an electrolytic capacitor (C8) to protect the circuitry from electronic interferences such as load dumps, reverse battery voltage, and ignition noise. The single pole single throw switch (S3) serves as a manual override which permits the user to switch off the power supply and manually adjust the shield.

The current output (circuit supply VS) of the power conditioning circuitry 40 is fed to the photo sensor circuitry 50, the photo sensor low pass filter and buffering circuitry 60, the low light level detection circuitry 70, the high level light detection and directional buffering circuitry 80, the steering relay drive circuitry 90, and the relay in the motor assembly circuitry at the connecting terminals as shown in FIG. 7. The system ignition voltage feed is fed through S3 power switch to motor assembly circuitry 100 at a terminal connector positioned between sensing switches S1 and S2 of circuitry 100.

The power supply conditioning circuitry 40 output is Operationally connected to the photo sensor circuitry 50 at the current input terminals of resistors (R1 and R2); quad operational amplifier U1 of the photo sensor low pass filter and buffer circuitry 60; the input terminals of resistors R20, R22, and R25 of the high level detection and directional buffering circuitry 80; the input terminals of resistors R11, R17, R18 and quad comparator U3$_a$ of the low light level detection circuitry 70; and the input terminal for the quad operational amplifier U2$_d$ resistor R26 and diode D2 of the steering relay drive circuitry 90.

The particular photo sensor circuitry 50 illustrated in FIG. 7 includes two fixed photo sensors (Pt1 and Pt2) suitably consisting of a planar silicon photo transistors type directionally biased with base resistors R1 and R2 respectively which serve as collector resistors for Pt2 and Pt2. The values of the base resistors (R9 and R10) and collector resistors (R1 and R2) are chosen so that the sensor output ranges are as linear and as wide as possible. This in turn permits sensors Pt1 and Pt2 to more readily adapt to the more significant light intensity range of exposure. A variety of photo diodes, darlington, field effect transistor, resistor types, etc. may also be applied herein. Substitution of the illustrated transistor sensors, Pt1 and Pt2, with another sensor type may be simply accomplished by changing the bias on the sensor (the Pt1 and Pt2 of the sensor circuitry) and threshold values in the controller (i.e. the higher level detection and directional buffering circuity 80 and the low light level detection circuitry 70).

The output of photo sensor circuitry 50 is operationally connected to the photo sensor low pass filter and buffer circuitry 60 by feeding the respective outputs of Pt1 and Pt2 into the photo sensor low pass filter and buffer circuitry 60 through amplifiers U1a and U1b of a circuitry configuration design so as to buffer the outputs of the Pt1 and Pt2 sensors. The photo sensor low pass filter and buffer circuitry 60 includes a pair of buffering amplifiers (U1a and U1b) Which drive low pass filters (R3, C1 and R4, C2) and the ambient light detectors (shown as open collector comparators U2a and U2b) through resistors (R15 and R16) of the low light level detection circuitry 70. The low pass filter outputs (R3, Cl and R4, C2) are fed to amplifiers (U1c and U1d) of the photo sensor low pass filter and buffer circuitry 60 which are likewise configured to buffer the low pass filters R3, C2 and R4, C1 output. The output of the buffering operational amplifiers (U1c and U1d) are inputted through two resistors (R6 and R7) to drive the open collector comparator (U2c) of the high level detection and buffering circuitry 80. The open collector output of a comparator (U2c) is pulled up through a resistor (R20) and is on or off depending upon the voltage input V10 and V9. A slight hysteresis is introduced through a resistor (R8) for purposes of rendering the system less vulnerable to noise. The comparator (U2c) output is inverted by the comparator circuitry of comparator U3d and resistors R22, R23, R24, and R25 so that the voltage swing of comparator U3d of the steering and relay drive circuitry 90 is sufficient enough to cross the reference value as set by resistor dividers R18 and R19 and filtered from noise by capacitor C3 at the inverting input of comparator U2d. Current will then flow onto the relay motor and drive circuitry 100 which in turn affords the appropriate relay and control switching mechanism for powering motor (M) to drive glare shield 5 to the proper glare shielding position.

It should also be observed that the FIG. 7 circuitry also includes means for switching off the current flow to the motor when the ambient light intensity is of too low a value. This arises (e.g. such as by a low level of ambient light detected by photo sensors Pt1 and Pt2) when the noninverting inputs of comparators U2a and U2b of circuitry 70 register a higher voltage input than that afforded by the resistor dividers R11 and R12, as adjusted by a potentiometer Vr1 and filtered by capacitor C6, the voltage input of comparators U2a and U2b will be pulled through the R17 resistor. Hysteresis feedback through resistors R23 and R14 are respectively incorporated into the low light detection circuitry 70 to render it less vulnerable to slight fluctuations. This particular circuitry design for comparators U2a and U2b will cause the outputs of comparators (U3a and U3b) to override any voltage changes occurring at comparator (U2c) and switch in resistor (R21) which sets up a divider with resistor (R20). The direction of current flow to the motor will not change since resistor divider (R20 and R21) is not enough to cross the threshold level previously set up at the noninverting input of comparator (U3d) because of the relatively large hysteresis set by the output of comparator (U3d) and resistors R22, R23, R24, and R25. Thus, when the total light level is too low, the control circuit becomes disabled and will not function until higher light levels are encountered. If desired, a default position of the shield may be incorporated into the circuitry when low light levels occur for a significant period of time or if light levels fall even lower, such as in darkness, simply by adding additional comparators and timing circuits thereto.

The electronic components references and prefixed by the letter "U" in FIG. 7 are connected to the power and ground sources. The U3 prefixed components (i.e. U3a, U3b, and U3d) may suitably consist of a low power quad comparator, while the "U1" (i.e. U1a, U1b, U1c, and U1d) and U2 (i.e. U2a, U2b, U2c, and U2d) prefixed series are low power operational amplifiers of an integrated circuit chip design. It will be accordingly observed from FIG. 7 that one of the pins of the U2 and U3 quad comparators, and the U1 quad OP amps are fed to the ground while the other pins of U2, U3, and U1 are connected to the current supply/2. In the FIG. 7 circuitry a plurality of nodes (referenced as V3-V19 inclusive therein) are incorporated for circuitry and component test purposes.

Referring in particular to the relay and motor assembly, circuitry 100, this circuitry includes means for stopping motor (M) when the glare shield 5 in response to a locomoting command signal approaches the terminal ends of guide track 20. For this purpose, two single pole double throw sub-miniature snap action switches (S1 and S2) are located immediately before the mechanical stops (i.e. terminal end) of guide track 20 so as to sense the track following guide 30 upon its approach to a stop position, and to disconnect and short the direct current motor (M) and thus limit further motorized glare shield 5 movement. This allows track following guide 30 to rest flush against the mechanical stop. Other electronic sensing methods mechanisms such as, photo detectors, magnetic reed switches, and hall effect sensors may also be used (depending on circuitry) to stop the automated glare shield 5 at desired stop locations. If greater precision is needed, a wire wound resistor or a thick film resistor screened, on a dielectric, on guide track 20 with a feedback strip may be used to measure the actual location of the glare shield 5 as it moves between the extremes.

In the relay and motor assembly circuitry 100 of FIG. 7, each pole of the double pole double throw relay switch (RLY1) is connected to the motor (M) for motor control. When one pole of the relay (RLY1) connects one side of the motor to ground, the other pole connects one of the sensing switches (S1 or S2) pole to the other Side of the motor (M). If the sensing switch (S1 or S2) pole, connected by one of the two poles of the relay (RLY1), becomes connected in the normally connected mode (such as by not being activated mechanically by the shield) a positive voltage Will flow through the activated sensing switch (S1 or S2) onto motor (M), thus activating the motor (M) and moving the shield toward the activated switch (S1 or S2), until the shield reaches the activated switch (S1 or S2). If desired, the current to the motor (M) can be controlled by other devices, such as, optical relays, and other semiconductor H-switch configurations.

FIG. 7 also depicts a means for switching the motor drive on and off. Current flowing through RLY1 is turned on or off by the transistor (Q1) which in turn is regulated (on or off) by the open collector comparator (U2d) output and resistors R26 and R27. Two diodes (D2 and D3) effectively protect the transistor (Q1) from the fly back currents of the coil in the relay (RLY1) while being switched.

The FIG. 7 circuitry also includes motor noise and overload controls. Two ferrite beads (F1 and F2) and two high Q glass capacitors (C4 and C5) serve as a radio frequency noise filter network. A bimetal current limit thermal safety switch (TS1) placed in series with the motor (M) loop will switch off should the motor (M) become locked, jammed, or otherwise inoperable. Circuit breakers, means for detecting the speed of the motor (M), or current sensing circuits to protect the motor (M) may also be incorporated, as desired, into the circuitry. For example, a small value resistor may be placed in series with the motor (M) to sense the voltage drop across the resistor. Accordingly, if the voltage reaches a predetermined threshold level for a prescribed time interval, the circuitry would switch off the motor (M). The motor (M) would accordingly remain off for a necessary time interval until the current sensing circuitry engages the motor (M) again. Commercially available direct current servo motor controller/driver, such as the Motorola MC33030 equipped with current sensing features, H switch drive, and other desirable features may be directly implemented into the FIG. 7 circuitry.

A single pole single throw switch (S3) may be used to simply disconnect power to the shield controller circuitry and allow the user/operator to manually maneuver the shield. The motor (M) drive gearing is preferably of a low friction if the manual override is desired. Alternatively, there may also be incorporated into the FIG. 7 circuitry a pair of override switches (one for each direction) which may be separately switched by the user to manually control the shield position. The gearing or drive for the shield in such a two switch override system may be appropriately provided by high friction drive system, such as worm gear combination.

A variety of power and drive mechanisms (mechanically or electromagnetically) may serve to propel or drive the track following guide 30 to the appropriate guide track 20 position. In addition to small sized electrical motors M powered by conventional automotive battery (e.g. 5–12 volt DC), vacuum powered motors or other mechanical locomotion means may also serve as the mechanical power source. If desired, a pair of electric motors (e.g. one operating clockwise rotation and the other counter-clockwise) operationally connected in series with micro switches, a reversible motor, servomotor, or other similar electrical motorized units may serve as the locomotive power source. Illustrative drive mechanisms for repositioning of the shield to the proper shielding position include belt driven drives, gear drives, sprocketed drives, chain drives, spring drives, flexible cable drives, direct shafted or geared linkages to motor, friction drives, and the like which are mechanically and operatively connected to the electrical motor M and track following guide 30 for transport along the curved guide track 20. A servomotor, drive pulley, and continuous belt combination may be used to advantage for this purpose. This particular combination may include a pair of small pulleys internally mounted upon shafts within housing member 21 at the opposing ends of curved guide track 20. One or both of the pulleys may be geared onto and directly driven by the electrical motor M. A continuous flexible friction belt (e.g. rubber, spring belt, etc.) pulling about the two pulleys and spaced at a distance sufficiently apart and guided within curved track 20 so as to frictionally engage onto track following guide 30 (e.g. onto post section 31) provides the preferred drive mechanism for propelling the glare shield 5 to the proper setting along guide track 20.

The following components, bearing the numerical references of FIG. 7 and the manufacturing and supply sources identified, may be utilized in the fabrication of the FIG. 7 automotive units.

| Figure 7 Reference | Description | Factory Number | Part | Vendor |
| --- | --- | --- | --- | --- |
| S1,S2 | MIN. SNAP ACTION SWITCHES | CHERRY 1 | EG1-OOK | NEWARK 14 |
| S3 | SPDT ROCKER SWITCH | C&K 4 | D101 J12S205QF | NEWARK 14 |
| M | FACTIONAL DC MOTOR | MABUCHI 12 | RS385S | MABUCHI 12 |
| RLY1 | 12 V DPDT RELAY | P&B 16 | 82S11D111-12 | NEWARK 14 |
| TS1 | BI METAL THERMAL SWITCH | GTE 11 | ESB 707C | GTE 11 |
| F1,F2 | FERRITE BEADS | FERROXCUBE 9 | 11418-4A6 | FERROXCUBE 9 |
| C4,C5,C7 | HI- .1 uF GLASS CAPACITORS | CORNING 6 | C1CO225U104Z050T | ARROW 2 |
| C1,C2,C3,C6 | .47 uF CERAMIC DISK CAPACITOR | PANASONIC 15 | ECR-F1H104ZF5 | DIGIKEY 7 |
| Z1 | .8 JOULE TRANSIENT VARISTOR | GE 10 | V220MA2A | NEWARK 14 |
| Pt1,Pt2 | PHOTO TRANSISTERS | GE 10 | L14C1 | NEWARK 14 |
| Q1 | GENERAL PURPOSE TRANSISTOR | NATIONAL 13 | 2N4401 | DIGIKEY 7 |
| D2,D3 | HIGH SPEED SWITCHING DIODES | DIODES 8 | 1N4148 | DIGIKEY 7 |
| D1 | GENERAL PURPOSE RECTIFIER | DIODES 8 | 1N4004 | DIGIKEY 7 |
| U1 (a,b,c, & d) | LOW POWER QUAD OP AMP | NATIONAL 13 | LM324AJ | DIGIKEY 7 |
| U2 & U3 (a,b,c & d) | LOW POWER QUAD COMPARITOR | NATIONAL 13 | LM339AJ | DIGIKEY 7 |
| Vr1 | 5K POTENTIOMETER | BOURNS 3 | 3296Y-1-502 | NEWARK 14 |
| R1,R2,R11 R18,R19 | 1K ¼ W CARBON FILM RESISTOR | YAEGO | USE DESCRIPTION | DIGIKEY 7 |
| R17,R20,R21 R25,R26 | 2.2K ¼ W CARBON FILM RESISTOR | YAEGO | USE DESCRIPTION | DIGIKEY 7 |
| R12 | 5.1K ¼ W CARBON FILM RESISTOR | YAEGO | USE DESCRIPTION | DIGIKEY 7 |
| R3,R4,R6 R7,R15,R16, R22,R23,R24 | 10K ¼ W CARBON FILM RESISTOR | YAEGO | USE DESCRIPTION | DIGIKEY |
| R8,R13,R14 R27 | 100K ¼ W CARBON FILM RESISTOR | YAEGO | USE DESCRIPTION | DIGIKEY 7 |
| R9,R10 | 1M ¼ W CARBON FILM RESISTOR | YAEGO | USE DESCRIPTION | DIGIKEY 7 |
| R28 | 1¼ W CARBON COMPOSITION RESISTOR | NEWARK | USE DESCRIPTION | ALLEN-BRADLEY 1 |

1. Allen-Bradley Company
   1414 Allen Bradley Drive
   El Paso, TX 79935
   800-952-4888
2. Arrow Electronics Inc.

| Figure 7 Reference | Description | Factory Number | Part | Vendor |
|---|---|---|---|---|
| | 430 West Rawson Avenue Oak Creek, WI 53154 414-792-0150 | | | |
| 3. | Bourns, Inc. 1200 Columbia Avenue Riverside, CA 92507 714-781-5050 | | | |
| 4. | C&K Components, Inc. 15 Riverside Avenue Newton, MA 02158 617-964-6400 | | | |
| 5. | Cherry Electrical 3600 Sunset Avenue Waukegan, IL 60087 312-578-3500 | | | |
| 6. | Corning Electronics 3900 Electronics Drive Raleigh, NC 27604 919-878-6200 | | | |
| 7. | Digikey Corp. 701 Brooks Avenue South Theif River Falls, MN 56701 800-344-4539 | | | |
| 8. | Diodes, Inc. 9957 Conoga Chatesworth, CA 95051 800-341-1736 | | | |
| 9. | Ferroxcube 129 Morgan Drive Norwood, MA 02662 617-769-6884 | | | |
| 10. | General Electric Corp. West Genesek Street Auburn, NY 13281 315-253-7321 | | | |
| 11. | GTE Corp. Route 35 Standish, ME 04084 207-642-4535 | | | |
| 12. | Mabuchi Motor America Corp. 475 Park Ave. South 32nd Street New York, NY 10016 212-686-3622 | | | |
| 13. | National Semiconductor Corp. 2900 Semiconductor Drive Santa Clara, CA 95051 408-737-5000 | | | |
| 14. | Newark Electronics 6414 Copps Avenue Madison, WI 53761 608-221-4738 | | | |
| 15. | Panasonic 1 Panasonic Way Secaucus, NJ 07094 201-348-5207 | | | |
| 16. | Potter & Brumfield, Inc. 200 South Richland Creek Drive Princton, IN 47671 812-386-1000 | | | |

What is claimed is:

1. An automated anti-glare device which may be automatically adjusted to shield a seated occupant's eyes from glare, said device comprising a base member equipped with means for mounting said base member onto an inner roof of a vehicle forward from the eyes, a curved guide track which includes a curved channel section of a substantially uniform curvature measuring from about 10 centimeters to about 50 centimeters in length compactly housed within said base member, a curved track following guide of an exterior configuration matingly engaged onto the substantially uniform curvature of the curved channel section to permit the curved track following guide to be slideably adjusted, a glare shield supportively connected onto the curved track following guide to permit the glare shield to be adjusted to a glare shielding position, means for directionally detecting light intensity, means for operatively converting the light intensity into a transmitted signal which registers onto the glare shielding position, relaying means for converting the transmitted signal into an electronic command signals, and a motor operatively responsive to the command signal for powering the track following guide to the glare shielding position; wherein the curved channel section is internally housed within a housing member, the housing member includes a slotted aperture bordered by an inner arc margin and an outer arc margin which define a curvature ranging from about 50 to 150 degrees, the curved channel section further includes an inner channel section equipped with a first guide track portion bordering onto the inner margin and a concentric outer channel section fitted with a second guide track portion bordering onto the outer margin, with the first guide track portion and the second guide track portion forming a trackway internally disposed within said housing member and the configuration of the track following guide matingly engages onto the substantially uniform curvature of said trackway.

2. The device according to claim 1 wherein the track consists essentially of a slotted aperture having an inner arc margin and an outer arc margin defining an enclosed arc ranging from about 70 to about 120 degrees in angular size, the first guide track portion is fitted with an internally disposed flanged guide track section bordering onto and extending laterally along the inner arc margin of said slotted aperture and the second guide track portion is fitted with an internally disposed flanged guide track section bordering onto and extending laterally along the outer arc margin of the slotted aperture, said track following guide consisting essentially of a central post section sized to abuttingly fit within the slotted aperture, a first flanged engaging projection transversely extending outwardly from said post section for correspondent registration and slideable engagement onto the first track portion, and a second flanged engaging projection extending transversely outwardly in an opposite direction from the post section in relation to said first projection for correspondent registration and slideable engagement onto said second guide portion.

* * * * *